Jan. 10, 1961 H. F. ECKERLE, JR., ET AL 2,967,993
MAGNETIC QUADRATURE CIRCUIT
Filed April 9, 1956

INVENTORS.
HARRY F. ECKERLE, Jr
NEVILLE L. RADCLIFFE, Jr
BY
ATTORNEY

United States Patent Office 2,967,993
Patented Jan. 10, 1961

2,967,993
MAGNETIC QUADRATURE CIRCUIT

Harry F. Eckerle, Jr., and Neville L. Radcliffe, Jr., Long Beach, Calif., assignors to North American Aviation, Inc.

Filed Apr. 9, 1956, Ser. No. 577,119
4 Claims. (Cl. 323—109)

This invention relates to phase converters and more particularly to an electrical circuit for converting an input signal to an output signal regulated in phase and voltage.

Many high speed precision rotational devices such as servo motors must obtain a rated speed within a short time after a starting voltage is applied or face the probability of having their motor windings burned out. These devices depend for their operability and accuracy on being connected to an electrical circuit which will adjust to a rated voltage in a short time after a variation in output or load voltage therein. In addition, a fixed phase excitation voltage in quadrature with a line voltage is often required to start these rotational devices.

Static devices for shifting the phase of a single phase input signal are well-known in the art. However, such devices are usually designed for a particular load only and exhibit poor qualities of efficiency and voltage regulation when there is any variation in the size or power factor of the load.

This invention contemplates a device which converts a single phase A.-C. voltage source to a voltage differing in phase by 90 degrees regulated both in magnitude and phase for large variation in load. A simple electrical circuit using only inductors and capacitors is provided which produces a transformation from single phase to quadrature phase without the use of vacuum tubes or movable contacts, thereby providing a regulated phase converter of high reliability and improved efficiency.

It is therefore an object of this invention to provide an improved magnetic phase converter.

It is another object of this invention to provide a circuit for converting an input signal to an output signal regulated in phase and voltage.

It is a further object of this invention to provide a phase shift network of improved efficiency.

It is a further object of this invention to provide a magnetic circuit to transform a single phase input to a regulated quadrature output.

Other objects of invention will become apparent from the following description taken in connection with the accompanying drawings, in which.

Figure 1:
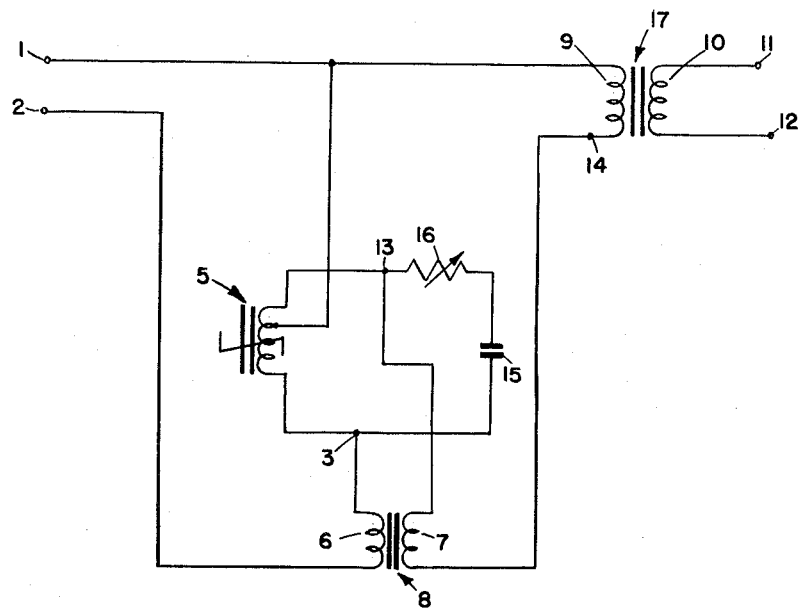
Fig. 1 is a schematic diagram of the device of this invention.

Referring now to the drawings and particularly to Fig. 1, there is shown in schematic a single phase A.-C. input circuit at terminals 1 and 2 and a quadrature phase output circuit at terminals 11 and 12. In series with the input circuit across terminals 1 and 2 is primary winding 6 of transformer 8 and a portion of saturable reactor 5. The core for saturable reactor 5 is selected from a high permeability low coercive force material such as Orthonal or Deltamax. More specifically, terminal 2 is connected to one end of winding 6. The other end of winding 6 is connected to point 3 which is one side of a parallel resonant circuit comprising saturable reactor 5 and capacitor 15 in parallel. The parallel resonant circuit thus formed acts as a phase shift network between the input and output terminals. Adjustable contact 1 on saturable reactor 5 is connected to one side of winding 9 of transformer 17 and to input terminal 1. The output quadrature phase load circuit across terminals 11 and 12 is coupled through transformer action to primary winding 9 of transformer 17. In series with primary winding 9 of transformer 17 is the secondary winding 7 of transformer 8 and a portion of saturable reactor 5. Specifically, one end of winding 9, point 14, is connected to one end of the secondary winding 7 of transformer 8. The other end of winding 7 is connected to point 13. The output series circuit is completed through the portion of saturable reactor 5 between point 13 and contact 1. Saturable reactor 5 is designed to saturate at a voltage below any probable operating line voltage. A value of capacitor 15 is selected so that during the portion of the cycle when reactor 5 is saturated, capacitor 15 resonates with the air core inductance of reactor 5 and winding 6 of transformer 8 at the excitation frequency which may be for example 400 cycles. Adjustable resistor 16 in series with saturable reactor 5 and capacitor 15 of the parallel resonant circuit adjusts the peak resonant condition of the circuit.

In order to obtain a regulated output voltage at terminals 11 and 12, it is desired to obtain a voltage reference which will remain constant upon changes in load and line voltage. For this reason, saturable reactor 5 was chosen as the constant voltage reference. The theory behind saturable reactors is well-known to those skilled in the art and need not be further described here. It is sufficient for our purposes to point out the constant time-voltage characteristics of a saturable reactor. As is well-known, the time-voltage integral required for the core of the saturable reactor to reach saturation remains substantially constant and independent of the impressed voltage across the reactor. Since the time of saturation of reactor 5 will vary inversely with the voltage impressed across the reactor, it follows that the volt-second increment at a given impressed voltage will be equal to the volt-second increment at a lower impressed voltage. Therefore, the effective impedance of the saturable reactor which is proportional to the volt-second increment required for the reactor to reach saturation remains substantially constant through various voltage ranges. It is this characteristic of the reactor which is utilized to make it a constant average voltage reference.

In operation, a regulated voltage output is developed across terminals 11 and 12 which differs in phase by 90 degrees from the input supply across terminals 1 and 2. As the load across terminals 11 and 12 increases due to the high starting current required for motors and the like which may be connected across the output terminals, the decreased impedance across secondary winding 10 of transformer 17 is reflected to primary winding 9 of transformer 17, secondary winding 7 of transformer 8, and saturable reactor 5. This decrease of load impedance causes a decrease in effective inductance through windings 6 and reactor 5, thereby retuning the parallel circuit formed by capacitor 15 with the aforesaid inductors. The impedance of the parallel resonant circuit then decreases. This decrease in impedance is reflected back to the input supply circuit across terminals 1 and 2 since a portion of the parallel resonant circuit is in series with terimnals 1 and 2. A decrease in impedance across terminals 1 and 2 causes the voltage to increase across the input supply circuit. This increase in voltage compensates for the tendency of the output circuit to decrease in voltage due to an increase in load. The parallel resonant circuit is returned and capacitor 15 is again resonating with saturable reactor 5 and winding 6 at the operating frequency. A change in the load of the output circuit also affects the phase relationship between the input supply voltage and the output quadrature voltage.

Operation of this phase regulation will be discussed below in relation to Figs. 2 and 3.

Figure 2:
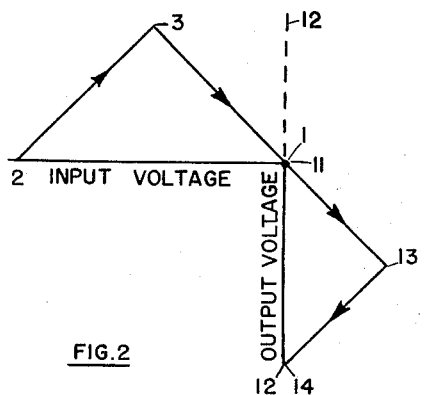
Fig. 2 is an explanatory graph of the voltage relations between the input and output circuits.
Figure 3:
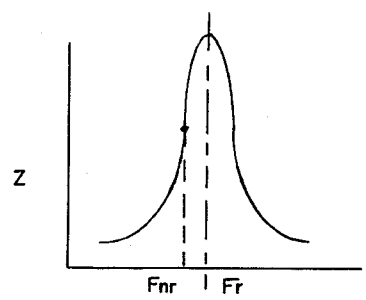
Fig. 3 is a graph showing the impedance characteristics of the parallel resonant circuit of this invention.

Turning now to Figs. 2 and 3, graphs are shown which teach clearly the operating characteristics of the parallel resonant circuit which produce the desired phase and voltage regulation of the load. As shown in Fig. 2, the input voltage across terminals 1 and 2 is equal vectorially to the summation of the voltages across terminal 2 and point 3 and point 3 and contact 1. Assuming the voltage across terminals 1 and 2 to be constant, the voltage across terminal 2 and point 3 varies with the load through winding 6. The average voltage across point 3 and contact 1 remains essentially constant at all times that saturable reactor 5 is saturated. Thus it can be seen from Fig. 2 that in the input supply circuit the voltage vector represented by points 3 and 1 will remain constant throughout load variations, and the voltage as represented vectorially by points 2 and 3 will vary with changes in load. Turning now to the output quadrature voltage shown vectorially in Fig. 2, the vector between points 11 and 12 represents the output voltage across terminals 11 and 12. Vectorially, the voltage across terminals 11 and 12 is in phase or 180° out of phase with the voltage between points 1 and 14. The magnitude of this voltage will depend on the turns ratio between the primary and secondary windings of transformer 17. Here again as described for the input voltage, the average voltage across point 13 and contact 1 is substantially constant because of the inherent constant impedance characteristics of saturable reactor 5. Since the average voltage between point 13 and terminal 1 as represented vectorially is constant, the voltage between terminal 14 and point 13 varies with the output voltage across terminals 11 and 12. The voltage across terminal 14 and point 13 is equal to the voltage across winding 7. As the load across terminals 11 and 12 increases and the voltage across the terminals decreases, this change in voltage is reflected to winding 7 and the voltage across terminal 14 and point 13 will change. In order to maintain a substantially quadrature relationship between the input voltage represented vectorially between points 1 and 2 and the output voltage represented vectorially between points 1 and 14 (coupled by transformer action to points 11 and 12), it is necessary for the voltages across points 2 and 3 in the input circuit and the voltage across points 14 and 13 in the output circuit to vary in such a way as to maintain the angle between the vector represented by point 1 and point 2 and in the vector represented by points 1 and 14 at 90 degrees.

Referring to Fig. 3, a graph is shown which indicates the variation of impedance with frequency in the parallel resonant circuit of this invention. In normal operation, the impedance of the circuit represented on the graph as 2 is at a maximum at the resonant frequency represented as $F_R$. By proper selection of values for capacitor 15, $F_R$ becomes equal to the operating frequency of the circuit at rated load. As the load current increases across terminals 11 and 12 of the output circuit, the decrease in impedance and inductance of winding 6 causes the operating frequency to decrease. $F_{NR}$, the operating frequency, is no longer the resonant frequency. The circuit is now operating at non-resonance. Since the circuit will exhibit maximum impedance characteristics only at resonance, a movement to the left or right by the operating frequency causes the impedance of the parallel circuit to decrease. A decrease in the impedance of the parallel resonant circuit lowers the impedance across terminals 1 and 2 of the input supply circuit, thereby raising the voltage across the input supply circuit. This rise in voltage is coupled to the output load circuit and causes the impedance of the output circuit to decrease. A charge in impedance is reflected to the parallel resonant circuit retuning the circuit so that capacitor 15 resonates with the inductive windings.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, a single phase alternating current input circuit having two terminals, a single phase alternating current output circuit having two terminals, and phase shifting apparatus connecting said input circuit with said output circuit whereby said output circuit is 90 degrees out of phase with said input circuit, said apparatus comprising a saturable reactor having two portions, a transformer whose primary winding is connected in series with one portion of said saturable reactor across said input terminals, the secondary winding of said transformer connected in series with the second portion of said saturable reactor across two of said output terminals, said portions being connected in series opposition, and a capacitor connected across said saturable reactor to form a resonant circuit.

2. A phase shift network comprising a pair of input terminals, a pair of output terminals, one of said input terminals connected in common with one of said output terminals, a transformer, a saturable reactor, a capacitor in parallel with said saturable reactor, the primary winding of said transformer and a portion of said saturable reactor connected in series across said input terminals, the secondary winding of said transformer and a portion of said saturable reactor serially connected across said output terminals, and impedance means in series with said saturable reactor and said capacitor whereby the voltage across said output terminals is in quadrature with the voltage across said input terminals.

3. A voltage regulating device comprising in combination, a pair of input terminals, a transformer, a pair of output terminals, one of said input terminals connected in common with one of said output terminals, parallel resonant circuit means, said resonant circuit means including a saturable reactor in parallel with a capacitor, said saturable reactor having two parts, the primary of said transformer and one part of said saturable reactor connected serially across said input terminals, the secondary of said transformer and the other part of said saturable reactor connected serially across said output terminals, whereby the voltage across said output terminals is 90 degrees out of phase with the voltage across said input terminals.

4. A phase shift network comprising a pair of input terminals, a pair of output terminals, one of said input terminals being in common with one of said output terminals, a transformer, a saturable reactor, the primary winding of said transformer and a first portion of said saturable reactor serially connected across said input terminals, the secondary winding of said transformer and a second portion of said saturable reactor serially connected across said output terminals, said first portion of said saturable reactor being connected in series opposition with said second portion of said saturable reactor, whereby the voltage across said output terminals is 90 degrees out of phase with the voltage across said input terminals, and a capacitor connected in parallel across said saturable reactor.

References Cited in the file of this patent

UNITED STATES PATENTS

| | | |
|---|---|---|
| 1,811,861 | Nyman | June 30, 1931 |
| 2,179,353 | Schmutz | Nov. 7, 1939 |
| 2,253,053 | Stevens et al. | Aug. 19, 1941 |

FOREIGN PATENTS

| | | |
|---|---|---|
| 130,612 | Australia | Dec. 10, 1948 |